May 23, 1933.    R. A. TRACE    1,910,485
COOKER
Filed Oct. 15, 1932    3 Sheets-Sheet 3

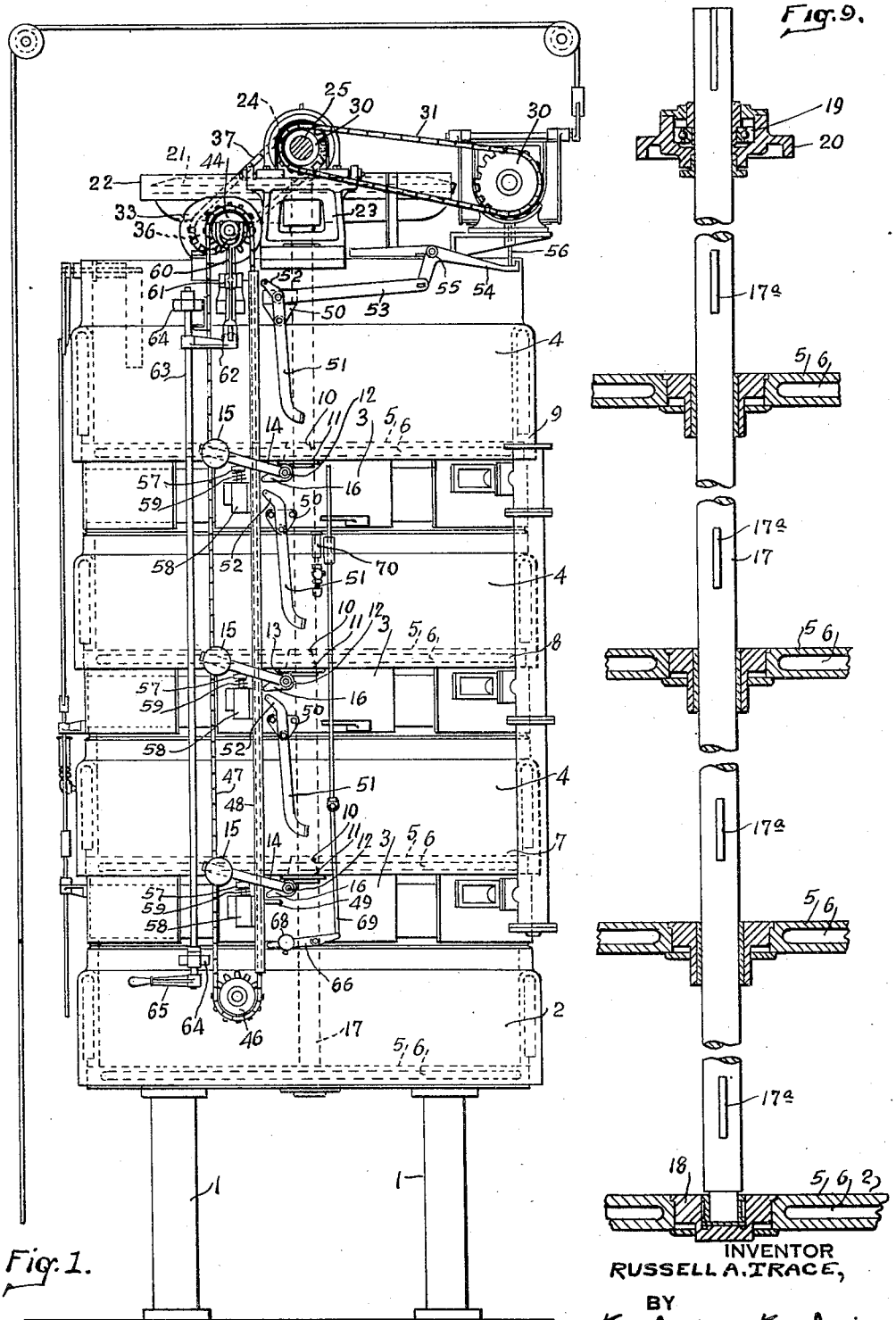

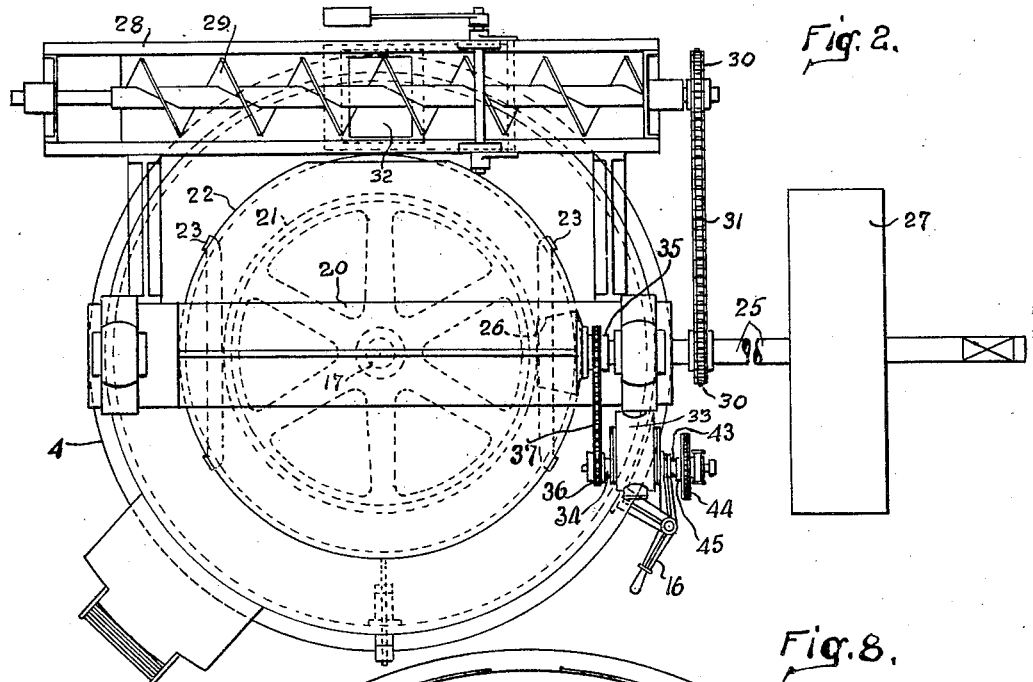
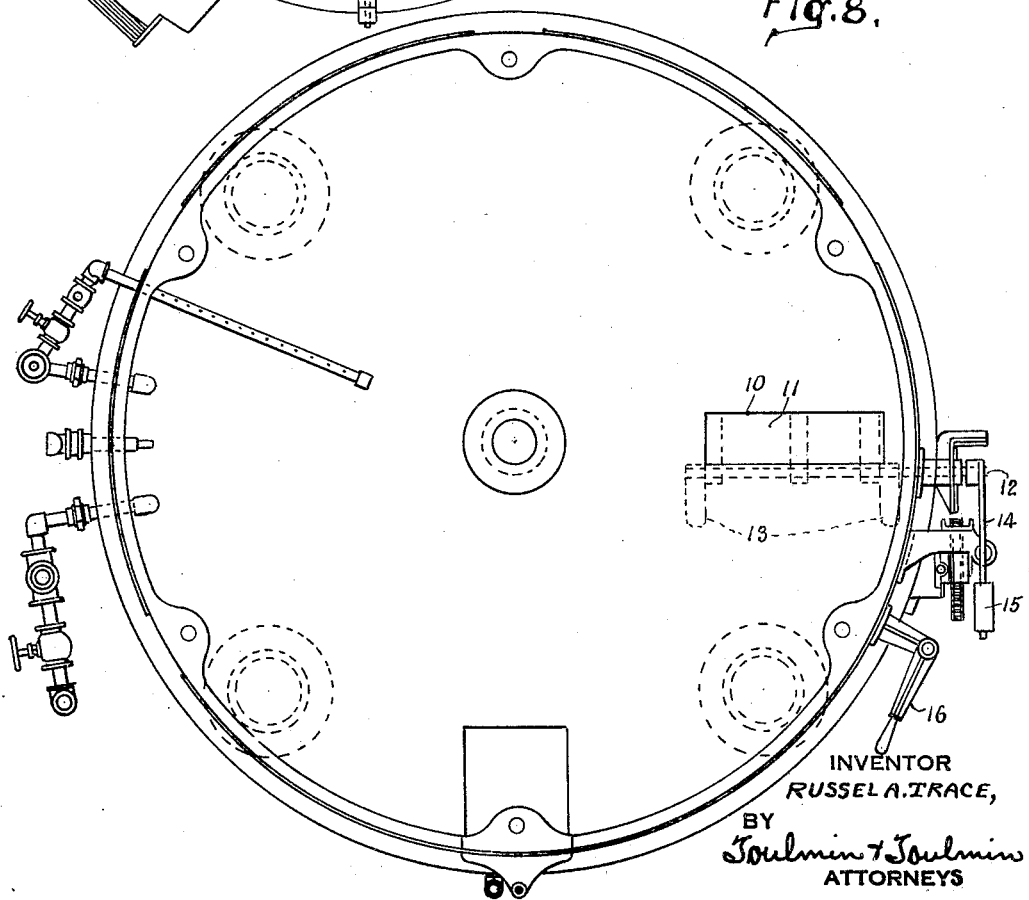

INVENTOR
RUSSELL A. TRACE,
BY
Toulmin & Toulmin
ATTORNEYS

Patented May 23, 1933

1,910,485

UNITED STATES PATENT OFFICE

RUSSELL A. TRACE, OF DAYTON, OHIO, ASSIGNOR TO BUCKEYE IRON AND BRASS WORKS, OF DAYTON, OHIO, A CORPORATION OF OHIO

COOKER

Application filed October 15, 1932. Serial No. 637,957.

This invention relates to improvements in cookers for seeds and the like, preparatory to extracting the oils therefrom.

The cooker is composed of a plurality of superimposed units, each unit comprising a receptacle adapted to receive the seeds from an upper receptacle and to discharge the seeds into a lower receptacle.

It is an object of this invention to provide, in connection with the cooker, operating mechanism therefor located on top of the superimposed units so that the mechanism for driving the parts of the cooker is remote from the operator and danger of harm is removed.

It is also an object of this invention to provide, in connection with a cooker, operating mechanism therefor in which the use of chains near the operator has been eliminated substantially. By placing the drive mechanism at the top of the cooker the drive mechanism does not accumulate, as it now does in the art, with the drive mechanism at the bottom of the cooker, and foreign material such as discharged seeds and the like, does not accumulate, which causes the belts to slip and the gears to become clogged.

It is particularly the object to provide a very short drive between the power mechanism that operates the stirrers and operates the discharge doors from one kettle to the other, and which also operates the feed to the topmost kettle.

It is an object to provide such a drive within substantially the diameter of the cooker, and to locate it at the top of the cooker where it will not interfere with the adjacent presses and the actions of the men.

It is an object to provide such a drive, in which several driving chains will be in substantial alignment, and to provide a change speed mechanism in which all that is necessary is to detach the sprocket from the hub and mount a new sprocket thereon.

By locating the operating mechanism on top of the cooker not only is all risk of harm removed but the weight of the apparatus has been reduced by six or seven hundred pounds, and the width of the cooker has been reduced nearly one-third.

These and other advantages will appear from the following description taken in connection with the drawings, which show a preferred embodiment of this invention.

Referring to the drawings:

Figure 1 is a side elevation of the cooker showing the external operating parts.

Figure 2 is a top plan view.

Figure 8 is a top plan view of one of the cooker units.

Figure 9 is a view showing the stirrer shaft.

Figure 3:
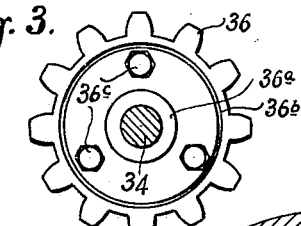
Figure 3 is a detail showing a form of sprocket wheel upon one of the gear case shafts.
Figure 4:
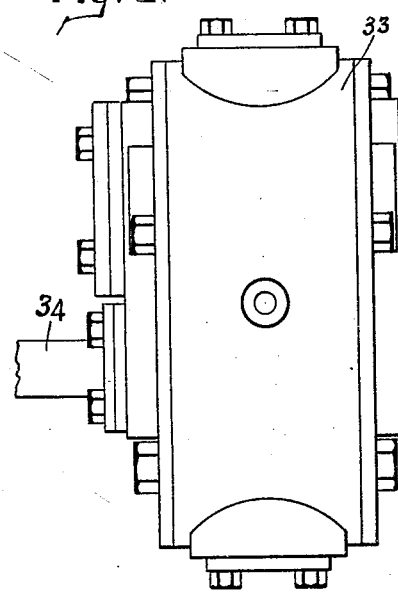
Figure 4 is a top plan view of the gear case shaft.
Figure 5:
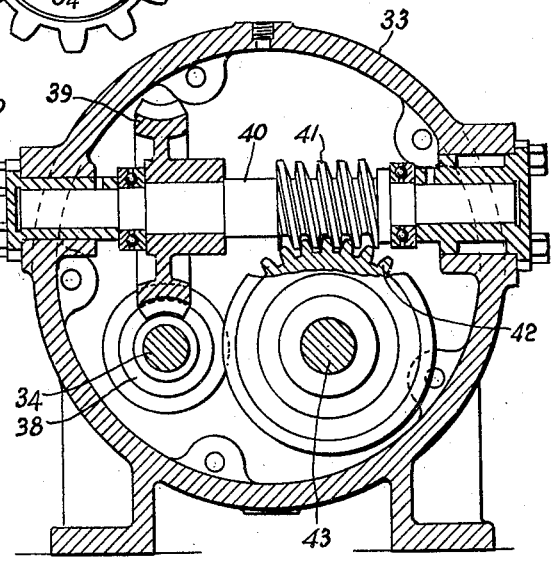
Figure 5 is a vertical, longitudinal section through the gear case.
Figure 6:
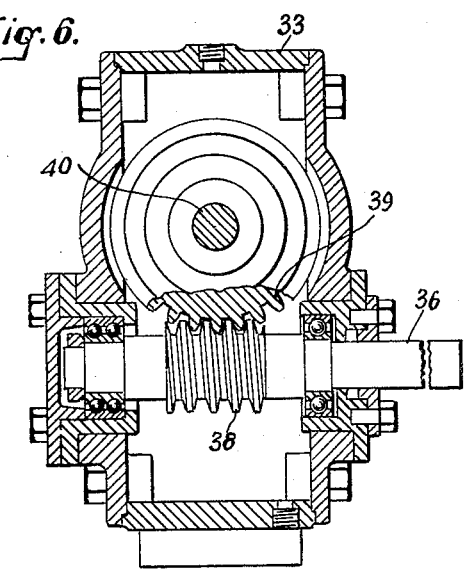
Figure 6 is a section on the line 6—6 of Figure 5.
Figure 7:
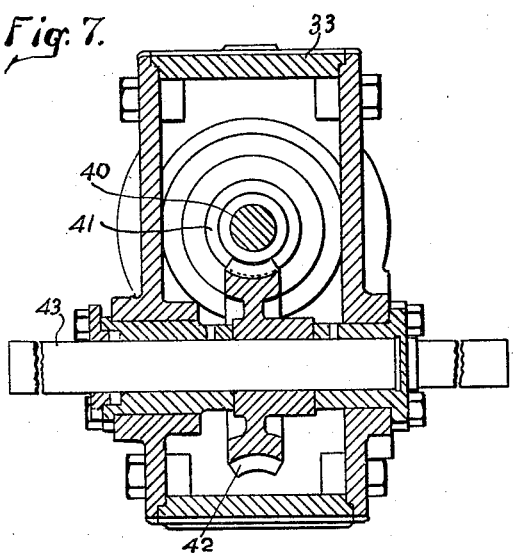
Figure 7 is a section on the line 7—7 of Figure 5.

The cooker is supported by means of supports 1 on top of which is a receptacle 2 adapted to receive the cooked seed for delivery to the presser, or to any other suitable object. Located above and on top of the receptacle is a plurality of cooker units, each composed of a lower oven-like section 3 and an upper container 4. Each container and the receptacle has a bottom 5 with a chamber 6 therein.

The units are indicated by numerals 7, 8 and 9, beginning with the lower unit. In the present instance three units are shown, but any number may be used, one placed on top of the other, as shown in Figure 1.

The bottom of each container has a discharge hole or passageway 10 therein adapted to be closed by means of a closure 11 supported on one side of the hole or opening by means of a shaft 12 pivoted in brackets 13, suitably attached to the bottom. On the upper end of each closure shaft is an arm 14, attached at one end to the shaft, with a weight 15 thereon adjacent the other end of the shaft for holding the closure in a position to close the hole or opening in the bottom of the container to prevent the passage of material from the container to one beneath it. There is also attached to each shaft 12, adjacent the arm 14, a trip arm 16, the purpose of which will be hereinafter described.

Extending vertically through the receptacle and the containers is a stirrer shaft 17, which has stirrer blades 17a mounted thereon for agitating the material within the containers. The lower end of this stirrer is supported in bearings 18 located in the floor of the receptacle 2. The upper end of this shaft is supported by means of a suitable bearing 19, located in a cross bar 20 supported on top of the topmost container. On the upper end of the shaft is a gear 21 inclosed within a gear case 22 to keep foreign matter away from the gear.

The gear casing is supported by means of brackets 23, which have thereon bearings 24 for supporting a main drive shaft 25, which extends transversely across the top of the superimposed stack of containers. On this main drive shaft is a pinion 26 which engages the gear 21 for rotating the stirrer shaft and the stirrer blades thereon. This main shaft is driven by means of a pulley 27.

Suitably supported on top of and at one edge of the upper container is a feed trough 28, which has located therein a feed screw 29. This feed screw has on one end a sprocket wheel 30. A similar sprocket wheel 30 is also mounted on the main drive shaft. These two sprocket wheels 30 are connected by means of a sprocket chain 31 for driving the feed screw from the main drive shaft. In this feed trough is a discharge door 32, which is normally closed to retain the material in the trough, but may be open for discharging the material into the upper one of the cooker container units.

Located on top of the upper unit and adjacent the main drive shaft is a reduction gear case 33, which has a shaft 34 rotatably mounted therein. This shaft has on one end, without the case, a sprocket wheel 36 connected to a sprocket wheel 35 on the main drive shaft by means of a sprocket chain 37. The sprocket wheel 36 is composed of three parts, a part 36a rigidly attached to the shaft, an outer part 36b, on the periphery of which are the sprocket teeth and bolts 36c, by which the two parts 36a and 36b are attached to each other.

By this means the diameter of the sprocket wheel 36 may be varied to vary the relative speed of rotation between the shaft 25 and the shaft 34. In order that the shaft 34 may have a relatively greater speed of rotation a smaller part 36b may be provided. By providing a larger part 36b the speed of rotation of the shaft 34 is reduced in comparison with the speed of rotation of the shaft 25.

On the shaft 34 within the gear case is a worm 38 which engages a worm gear 39 located on the shaft 40 suitably supported in bearings in the gear case. On the shaft 40 is a worm 41 which engages a worm gear 42 located on a shaft 43. The shafts 43, 34 and 25 are parallel and are substantially in the same plane so there is a direct line of action between the drive shaft and each of the shafts located in the case.

On the shaft 43 without the gear case is a loosely mounted sprocket wheel 44 adapted to be engaged by a clutch 45 for rotation with the shaft 43. Located on the container 2 at the bottom of the cooker is a sprocket wheel 46 geared to the sprocket wheel 44 by means of a sprocket chain 47. This sprocket chain moves up and down on one side of the cooker and in its upward movement is guided and positioned by means of a guide case 48. This chain has extending outwardly therefrom a trip finger 49 adapted to engage the trip arms 16 as it moves upwardly to successively drop the closures for the discharge of material from one container to that beneath it.

The weights 15 tend to hold these closures in a closed position, but when the trip finger 49 strikes the arm 16 the weight is elevated and the closure is dropped so that the material may pass from one container to that beneath it. After the finger passes beyond the trip arm the weight 15 can close the closure.

Adjacent the top of each cooker unit is a bracket 50, to which is pivoted a lever 51 intermediate the ends thereof. The upper part of each lever is bent to one side, as indicated by the numeral 52, so that it is in the path of the trip finger 49 as it moves upwardly. These levers are for the purpose of operating the closure of the feed trough and for that reason the lever located on the upper unit has attached thereto one end of a link 53, while the other end of this link is attached to one end of a bell-crank lever 54, pivoted at the point 55.

The other end of the lever 54 is attached by means of a link 56 to the discharge door or closure 32 for the feed trough. The lower end of each lever 51 acts as a weight to close this closure 32 when the trip finger passes beyond the part 52. Each arm 14 and its weight 15 are provided with a stop, which consists of a vertically extending member 57 extending downwardly into a casing 58, and supported resiliently therein by means of a spring 59. The purpose of this stop is to prevent the closure from closing with a slam.

The clutch is operated by means of a clutch pinion lever 60 pivoted at 61 to a bracket on one side of one of the cooker units. The upper end of this lever 60 is provided with a yoke for engaging the clutch. The lower end of the lever is engaged by means of an arm 62 located on the upper end of a vertical shaft 63, pivotally supported by means of brackets 64.

On the lower end of this shaft 63, adjacent the receptacle 2, is a handle 65 for rotating the shaft and operating the clutch to throw it out of engagement or into engagement with the cooperating clutch member located on the sprocket wheel 44. Pivoted at the point 67 to the bottom of the lower unit is a lever 66, which has on one end a weight 68, while there is pivotally connected to its other end one end of a rod 69 which operates a timing whistle 70.

When the apparatus is in operation the seeds are placed within the trough. The screw therein moves the seeds toward the discharge opening. In the position shown in Figure 1, it is assumed that all of the containers are full and in operation. The cooking action is taking place. The sprocket chain with the finger 49 thereon is constantly moving. The finger 49 is about to contact the lower trip arm 16. As it moves up it trips this arm and causes the closure to open so that the material in the lower cooker unit drops into the receptacle 2. After the trip finger 49 passes beyond the trip arm 16 the closure closes.

This trip finger passes up and engages each succeeding arm 16 so that the material in each container is successively discharged to a lower container. When the trip finger reaches the part 52 of the lever 51, located on the top unit, it operates the closure of the feed trough to open so that additional seeds or material are discharged from the trough into the upper cooker unit.

These operations are repeated one after the other and form one cycle in the operation of the apparatus. For another cycle the trip finger passes over the sprocket wheels and again starts its upward movement. After the finger has reached its uppermost limit it travels downwardly from the upper sprocket wheel to the lower sprocket wheel. The speed at which this finger travels may be regulated by regulating the size of the sprocket wheel on the shaft 34.

It will be understood that I desire to comprehend within this invention such modifications as come within the scope of my claims and my invention.

Having thus fully described my invention, what I claim as new and desire to secure by Letters Patent, is:

1. In a cooker, the combination with a plurality of superimposed containers, a stirrer shaft extending vertically through the containers, a main horizontal shaft supported on the uppermost container and having a driving connection with said vertical shaft, a second horizontal shaft mounted upon said uppermost container, a driving connection between said main shaft and said second shaft, and a trough in which said second shaft operates, a third horizontal shaft mounted on said uppermost container, said third shaft having a sprocket wheel connection with said main shaft and adapted to be driven thereby, said third shaft having a connection to a sprocket wheel overhanging the periphery of the uppermost container, a sprocket wheel mounted on the peripheral side walls of the lowermost container, a chain passing around the last named sprocket wheels, a trip member on the chain, and means operated by the trip member to cause material in the containers and the trough to be discharged.

2. In a cooker, the combination with a plurality of superimposed containers, a stirrer shaft extending vertically through the containers, a main horizontal shaft supported on the uppermost container and having a driving connection with said vertical shaft, a second horizontal shaft mounted upon said uppermost container, a driving connection between said main shaft and said second shaft, and a trough in which said second shaft operates, a third horizontal shaft mounted on said uppermost container, said third shaft having a sprocket wheel connection with said main shaft and adapted to be driven thereby, said third shaft having a connection to a wheel overhanging the periphery of the uppermost container including a gear case, said case having reduction gearing therein, a sprocket wheel mounted on the peripheral side walls of the lowermost container, a chain passing around the last named sprocket wheels, a trip member on the chain, and means operated by the trip member to cause material in the containers and the trough to be discharged.

3. In a cooker, the combination with a plurality of superimposed containers, a stirrer shaft extending vertically through the containers, a main horizontal shaft supported on the uppermost container and having a driving connection with said vertical shaft, a second horizontal shaft mounted upon said uppermost container, a driving connection between said main shaft and said second shaft, and a trough in which said second shaft operates, a third horizontal shaft mounted on said uppermost container, said third shaft having a sprocket wheel connection with said main shaft and adapted to be driven thereby, said third shaft having a connection to a wheel overhanging the periphery of the uppermost container, a sprocket wheel mounted on the peripheral side walls of the lowermost container, a chain passing around the last named sprocket wheels, a trip member on the chain, and means operated by the trip member to cause material in the containers and the trough to be discharged, and a clutch connection whereby said overhanging sprocket may be disconnected from said main driving shaft.

4. In a cooker, the combination with a plurality of superimposed containers, a stirrer shaft extending vertically through the containers, a main horizontal shaft supported on the uppermost container and having a driving connection with said vertical shaft, a second horizontal shaft mounted upon said uppermost container, a driving connection between said main shaft and said second shaft, and a trough in which said second shaft operates, a third horizontal shaft mounted on said uppermost container, said third shaft having a sprocket wheel connection with said main shaft and adapted to be driven thereby, a part rigidly attached to said third shaft and a part removably attached to said first named part, said third shaft having a connection to a wheel overhanging the periphery of the uppermost container, a sprocket wheel mounted on the peripheral side walls of the lowermost container, a chain passing around the last named sprocket wheels, a trip member on the chain, and means operated by the trip member to cause material in the containers and the trough to be discharged.

5. In a cooker, the combination with a plurality of superimposed containers, a stirrer shaft extending vertically through the containers, a main horizontal shaft supported on the uppermost container and having a driving connection with said vertical shaft, a second horizontal shaft mounted upon said uppermost container, a driving connection between said main shaft and said second shaft, and a trough in which said second shaft operates, a third horizontal shaft mounted on said uppermost container, said third shaft having a sprocket wheel connection with said main shaft and adapted to be driven thereby, said third shaft having a connection to a wheel overhanging the periphery of the uppermost container including a gear case, said case having reduction gearing therein, a sprocket wheel mounted on the peripheral side walls of the lowermost container, a chain passing around the last named sprocket wheels, a trip member on the chain, and means operated by the trip member to cause material in the containers and the trough to be discharged, and a clutch connection whereby said overhanging sprocket may be disconnected from said main driving shaft.

In testimony whereof, I affix my signature.

RUSSELL A. TRACE.